United States Patent
Brose et al.

(10) Patent No.: US 11,746,824 B2
(45) Date of Patent: Sep. 5, 2023

(54) FASTENING UNIT AND MODULES

(71) Applicant: SATA GmbH & Co. KG, Kornwestheim (DE)

(72) Inventors: Jens Brose, Ottmarsheim (DE); Ralf Gehrung, Stuttgart (DE)

(73) Assignee: SATA GmbH & Co. KG, Kornwestheim (DE)

( * ) Notice: Subject to any disclaimer, the term of this patent is extended or adjusted under 35 U.S.C. 154(b) by 315 days.

(21) Appl. No.: 16/902,657

(22) Filed: Jun. 16, 2020

(65) Prior Publication Data
US 2020/0309189 A1    Oct. 1, 2020

Related U.S. Application Data

(63) Continuation of application No. 15/506,744, filed as application No. PCT/EP2015/001728 on Aug. 25, 2015, now Pat. No. 10,690,178.

(30) Foreign Application Priority Data

Aug. 26, 2014    (CN) .......................... 201420486168.3
Aug. 26, 2014    (CN) .......................... 201420486205.0
Aug. 26, 2014    (CN) .......................... 201420486221.X

(51) Int. Cl.
*F16C 11/04*    (2006.01)
*A62B 9/04*    (2006.01)
(Continued)

(52) U.S. Cl.
CPC ................ *F16C 11/04* (2013.01); *A62B 7/02* (2013.01); *A62B 9/04* (2013.01); *A62B 17/04* (2013.01);
(Continued)

(58) Field of Classification Search
CPC ......... A45F 2005/025; A45F 2005/026; A62B 9/04; B05B 7/2491; B05B 7/2416
See application file for complete search history.

(56) References Cited

U.S. PATENT DOCUMENTS 3,949,966 A    4/1976 Fabish
6,394,088 B1 *    5/2002 Frye .................... A61M 16/207
                                                                128/205.24
(Continued)

FOREIGN PATENT DOCUMENTS

DE    29704328 U1    5/1997
DE    60133645 T2    5/2009
(Continued)

OTHER PUBLICATIONS

English translation of the International Preliminary Report on Patentability and Written Opinion for PCT/EP2015/001728 filed Aug. 25, 2015.
(Continued)

*Primary Examiner* — Bradley J Osinski
(74) *Attorney, Agent, or Firm* — Paul D. Bianco; Katharine Davis Wong; Fleit Intellectual Property Law

(57) ABSTRACT

A fastening unit, in particular a fastening unit for modules which are intended to supply a user of a breathing mask or breathing hood with breathable air, and to such modules. The fastening unit is designed to secure one module relative to another module, and has a first component part for assembly with the other module and a second component part for assembly with the module. The second component part is rotatable, by means of the first component part, about a predetermined angle relative to the first component part; and first and second subcomponents within the region of the defined angle can engage with each other in a plurality of positions.

19 Claims, 15 Drawing Sheets

(51) Int. Cl.
  *A62B 7/02* (2006.01)
  *A62B 17/04* (2006.01)
  *A62B 18/02* (2006.01)
  *B05B 9/04* (2006.01)
  *B05B 7/24* (2006.01)

(52) U.S. Cl.
  CPC .............. *A62B 18/02* (2013.01); *B05B 9/04* (2013.01); *B05B 7/2416* (2013.01); *B05B 7/2491* (2013.01)

(56) References Cited

U.S. PATENT DOCUMENTS

| | | |
|---|---|---|
| 6,619,286 B2 | 9/2003 | Patel |
| 7,328,700 B2 | 2/2008 | Baker |
| 8,333,310 B2 | 12/2012 | Tages |
| 8,584,916 B1 | 11/2013 | Chen |
| D703,806 S | 4/2014 | Hu |
| 2003/0160075 A1 | 8/2003 | Musarella et al. |
| 2006/0032647 A1 | 2/2006 | Petty |
| 2006/0065261 A1 | 3/2006 | Files |
| 2006/0065672 A1* | 3/2006 | Lecourt ............... F17C 1/04 222/3 |
| 2006/0237495 A1* | 10/2006 | Chen ................. A45F 5/02 224/669 |
| 2007/0023468 A1 | 2/2007 | Ford |
| 2008/0047559 A1* | 2/2008 | Fiori ............... A61M 16/0666 128/207.18 |
| 2008/0203124 A1 | 8/2008 | Gorings |
| 2008/0257928 A1 | 10/2008 | Lowry et al. |
| 2010/0276463 A1 | 11/2010 | Gregory et al. |
| 2010/0288804 A1* | 11/2010 | Youssefi-Shams ..... A45F 5/021 224/676 |

FOREIGN PATENT DOCUMENTS

| | | |
|---|---|---|
| DE | 19824264 A1 | 12/2009 |
| EP | 0747095 A2 | 12/1996 |
| EP | 1294448 B1 | 4/2008 |
| WO | 0077469 A1 | 12/2000 |
| WO | 0197914 A1 | 12/2001 |
| WO | 2009048584 A1 | 4/2009 |
| WO | 2014/012064 A2 | 1/2014 |
| WO | 2013/122824 A2 | 8/2022 |

OTHER PUBLICATIONS

International Search Report dated Mar. 16, 2016 for PCT/EP2015/001728 filed Aug. 25, 2015.
Written Opinion dated Mar. 29, 2016 for PCT/EP2015/001728 filed Aug. 25, 2015.
Report on Patentability from European Patent Office for EP 15 778 207.9, dated Jun. 9, 2020 (5 pages).
International Search Report and International Preliminary Report on Patentability for PCT/EP2015/01728, filed Aug. 25, 2015 (29 pages).

* cited by examiner

90°

22,5°

45°

-22,5°

-45°

FASTENING UNIT AND MODULES

FIELD OF THE INVENTION

The present invention relates to a fastening unit, in particular a fastening unit for modules that are intended to supply a user of a breathing mask or breathing hood with breathable air, and to such modules.

BACKGROUND

In painting applications in which spray guns operated with compressed air and using solvents are used, it is inevitable for so-called "overspray" to occur. This means that the working area is contaminated with an undesirable amount of paint or paint droplets, which is also extremely harmful to the human body. It is therefore necessary to provide health protection for the workers. Breathing hoods, which can preferably be secured over the whole head and, in particular, over the whole face of the worker, are exceptionally well-suited to this purpose and offer maximum health protection. Breathing hoods of this type are generally supplied with compressed air independently of the ambient air. To this end, as a rule, first compressed air is fed to an air processing system, which first of all, comprises a single-stage or a multi-stage filtration system. Subsequently, the filtered air is fed via a compressed air hose to a waist strap, or a hip belt which, as a rule, is fitted with at least one additional auxiliary air processing module. One air processing module may be an activated charcoal adsorbent, another air processing module may be an air heater module or an air humidifier module. The activated charcoal adsorbent module makes it possible to remove undesirable vapors and gases, which may still be contained in the compressed air. An air heater module and/or an air humidifier module offer(s) additional benefits for health and well-being. Another useful embodiment proposes to attach an air regulator module and an air distributor module to the waist strap or hip belt. The overall structure is generally referred to as belt unit. This type of useful belt unit is used in combination with a breathing hood known under the product name "Vision 2000" of SATA GmbH & Co. KG.

Today, users of respiratory protection systems impose increasingly higher demands on ensuring health protection and user friendliness. On the other hand, manufacturers and producers of component parts want products which can be easily manufactured, easily installed and, if necessary, easily removed.

SUMMARY

One aspect of the disclosure relates to suggesting a possible way of solving the problems outlined above.

Accordingly, a fastening unit is disclosed. The fastening unit according to the present invention makes it possible to easily and securely install and remove various modules which are, in particular, designed to improve the supply of breathable air to a user of a breathing mask or breathing hood.

Further details and embodiments of the invention are also disclosed in the description that follows and in the drawings described below.

The fastening unit according to the present invention is designed to easily secure and subsequently to easily remove an air processing module, especially- to and from a waist strap or hip belt, which is worn by a workman, such as a spray painter, who is wearing an air supplied breathing mask or breathing hood in a spray booth.

BRIEF DESCRIPTION OF THE DRAWINGS

The appended drawings are an integral part of the description and are provided to explain the present invention in greater detail. They illustrate possible embodiments of the present invention and serve to explain the principles of the present invention in conjunction with the description. In the appended drawings, components having identical functions are identified by identical reference characters.

In the drawings.

Figure 11:
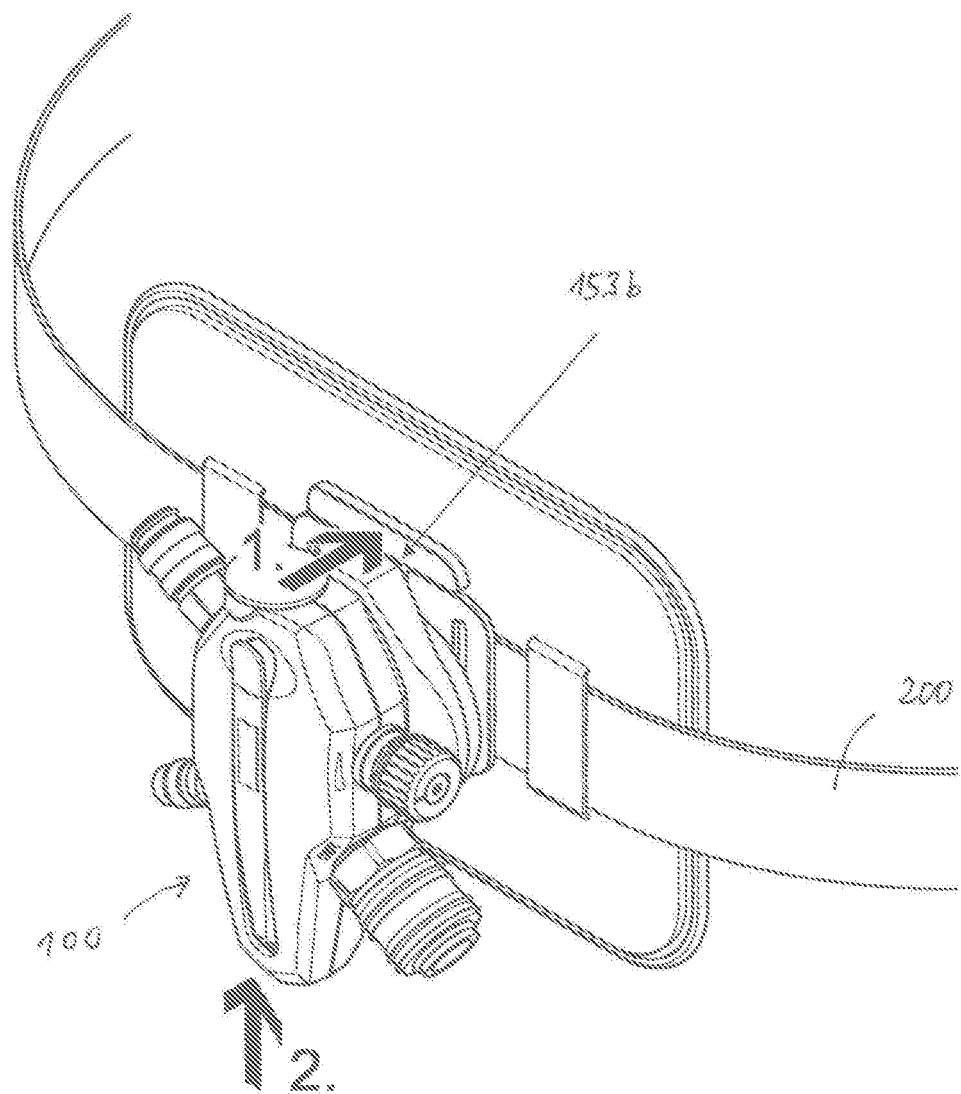

and,

FIG. 11 is a schematic perspective view showing the removal of the fastening unit with the air regulator unit from the hip belt.

DETAILED DESCRIPTION OF THE EMBODIMENTS

The following detailed description should be understood with reference to the drawings which are an integral part of the description and which, by way of an example, illustrate the possibilities offered by the present invention. In the drawings, directional information, such as top, bottom, inside and outside, should be understood with reference to the drawings described. Components of the embodiments of the invention can be configured in a plurality of different directions, which is to say that the directional information is used only for the purpose of illustration and does not imply any limitations. The description should also be understood to mean that different embodiments are possible, and structural or logical modifications are based on the premise that they are allowed in accordance with the scope of the invention. This means that the following detailed description is not to be understood to imply a limitation. It is obvious that features of the different embodiments described below can be combined with each other, unless specifically stated otherwise As FIGS. 1A and 1B, and FIGS. 2A and 2B show the fastening unit 4 according to the present invention comprises a first component part 1, a second component part 2, a first screw 3 with a first head part and a first hollow screw extension, a spring 3a and a second screw 3b with a second head part and a second screw extension.

Figure 1A:
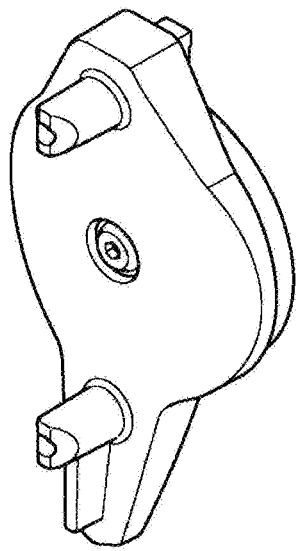
FIGS. 1A and 1B are perspective views of a global fastening unit according to the present invention.
Figure 1B:
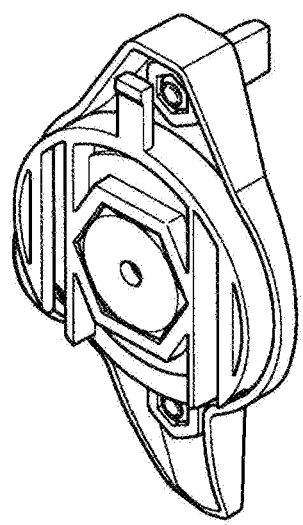
Figure 2A:
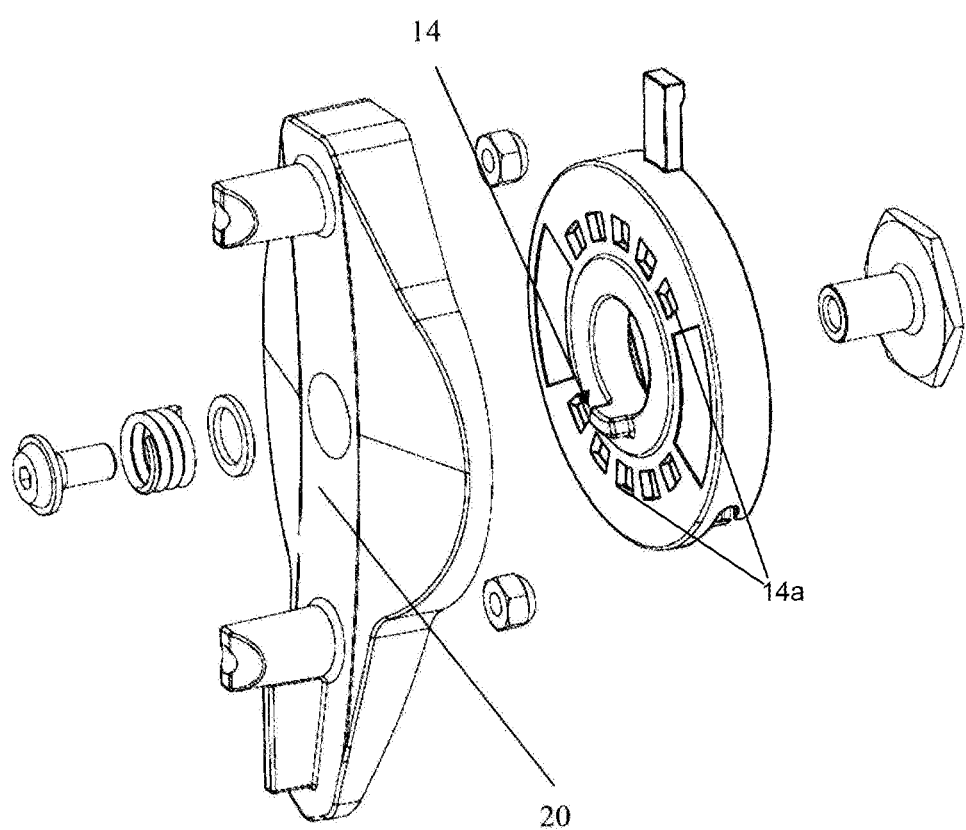
FIGS. 2A and 2B are exploded views of the global fastening unit.
Figure 2B:
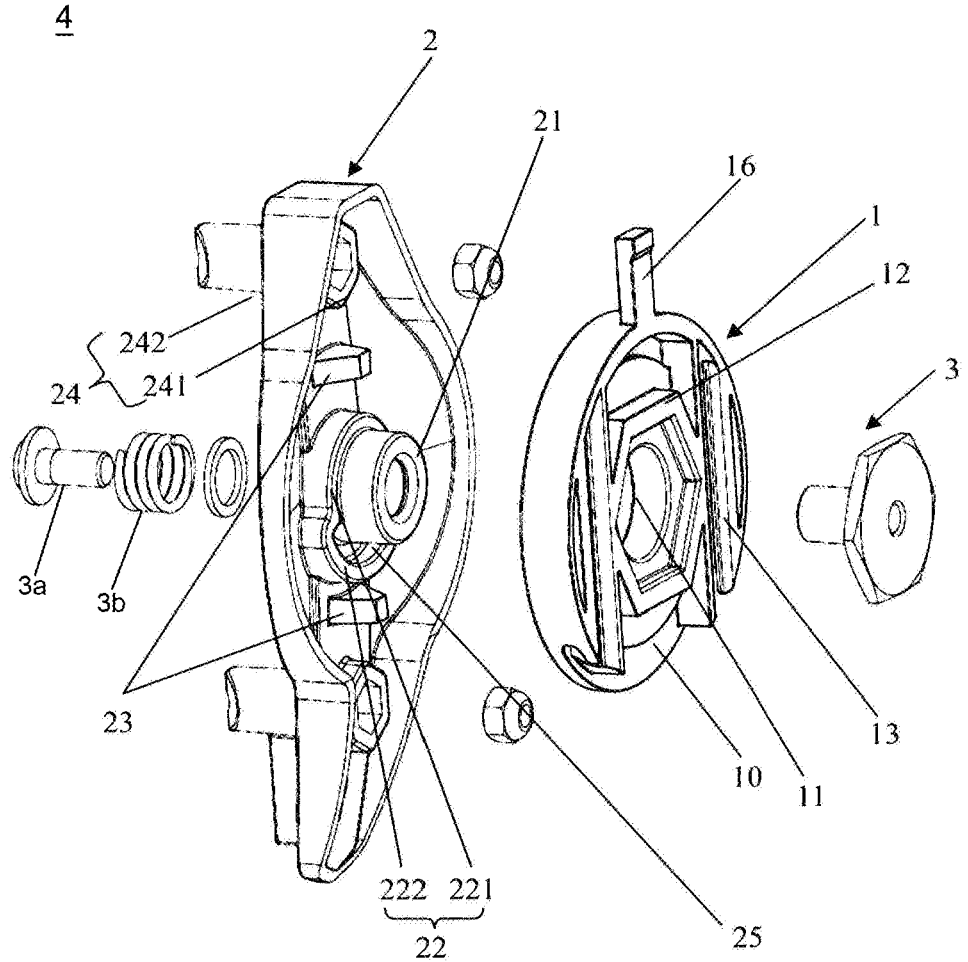

The first component part 1 has a substantially cylindrical contour and, as indicated in FIGS. 2A and 2B, comprises a first substrate 10 with a first surface and a second surface disposed opposite to the first surface. A central through-hole 11 passes through the first substrate 10. A hexagonal frame 12 is disposed around the central through-hole 11 and on the first surface. A stop 14 and locking grooves 14a disposed on the second surface, as well as an outwardly oriented projection 13 and 16 define the first component part 1.

As FIGS. 2A and 2B show, the second component part 2 comprises a second substrate 20 with a first surface and a second surface disposed opposite to the first surface. A first hollow projection 21 projects outwardly from the first surface and passes through the second substrate 20. In addition, there is a second projection 22, the diameter of which is larger than that of the first projection 21, the height of which, however, is shorter than that of the first projection 21, with the second projection 22 enclosing the first projection 21. Dedicated to the projection 21 are two locking pins 23, which are able to engage the locking grooves 14a of the first component part 1 so as to lock the second component part 2 in place in a specific engaged position. A fastening part 24 can be inserted into a fastening hole of a module, e.g., an air regulator module, to jointly fasten it to another component or object.

In addition, as FIGS. 2A and 2B show, the second projection 22 comprises a first section 221 and a second section 222, with an inner circumferential wall of the first section 221 on an outer peripheral wall of the first projection 21 and an inner circumferential wall of the second section 222 and an outer circumferential wall of the first projection 21 defining a guiding groove 25 for receiving a stop 14. The first section 221, the second section 222, the first projection 21 and the stop 14 are coordinated relative to each other so that the second component part 2 can be rotated about an angle which is a predefined angle relative to the first component part, with the predefined angle being less than 180 degrees.

As indicated in FIGS. 1A, 1B and FIGS. 2A, 2B, the first screw 3 is sequentially inserted into the through-bore 11 and subsequently into a hollow portion of the first projection 21 from a side where the first component part 1 is disposed. The spring 3a, into which the second screw 3b is inserted, is sequentially introduced into an assembled hollow portion of the first projection 21 from a side where the second component part 2 is disposed so that the first hollow screw extension of the first screw 3 receives the second hollow screw extension of the second screw 3b and the spring 3a encloses the first screw extension of the first screw 3. In addition, a seal between the head part of the first screw 3 and the spring 3a can be provided as well. The first component part 1 and the second component part 2 are assembled in such a way that the stop 14 of the first component part 1 is received in the guide groove 25 of the second component part 2 and the locking pins 23 of the second component part 2 are locked in place in the locking grooves 14a of the first component part 1.

Furthermore, as shown in FIG. 2A, five locking grooves are configured into an upper portion of the second surface of the first substrate 10 and five locking grooves are configured into a lower portion of the second surface of the first substrate 10 and disposed symmetrically about a central axis of the central through-hole 11. In addition, in conformity with the guide groove 25 of the second component part 2, the five locking grooves on the lower surface are aligned to conform to a peripheral region which is defined by the second surface.

In the fastening unit 4 configured as described above, the second component part 2 can be rotated and when the locking pins 23 of the second component part 2 interact with the locking grooves 15 of the first component part 1 as a result of an expansion of the spring 4. The locking pins 23 of the second component part 2 can engage in other locking grooves 14a, which makes it possible for the second component part 2 to engage the first component part 1 in a plurality of positions. In addition, the inner circumferential wall of the first section 221 of the second projection 22 is near the outer peripheral wall of the first projection 21, and the guide groove 25 is between the inner circumferential wall of the second section 222 and the outer circumferential wall of the first projection 21 so that the stop 14 of the first component part 1 is able to move in the guide groove 25, and the rotatable angular range of the second component part 2 relative to the first component part 1 is limited, which prevents the additional auxiliary module on the fastening unit 4 from being rotated into an undesired position.

As mentioned earlier, the five pairs of symmetrical locking grooves are configured in the first component part 1 in such a manner that the second component part 2 has five engaged position relative to the first component part 1. As can be seen in FIGS. 5A to 5E, the second component part can be rotated about 22.5 degrees, −22.5 degrees, 45 degrees and −45 degrees relative to the first component part and can be locked in place in the respective positions.

As shown in FIGS. 2A and 2B, the fastening part 24 comprises a third hollow section 241 and a fourth hollow section 242, with the third section 241 being positioned on the same surface as the first projection 21. On the second substrate 20, the fourth section 242 is positioned on the surface disposed opposite to the first projection 21 of the second substrate 20.

Figure 3:
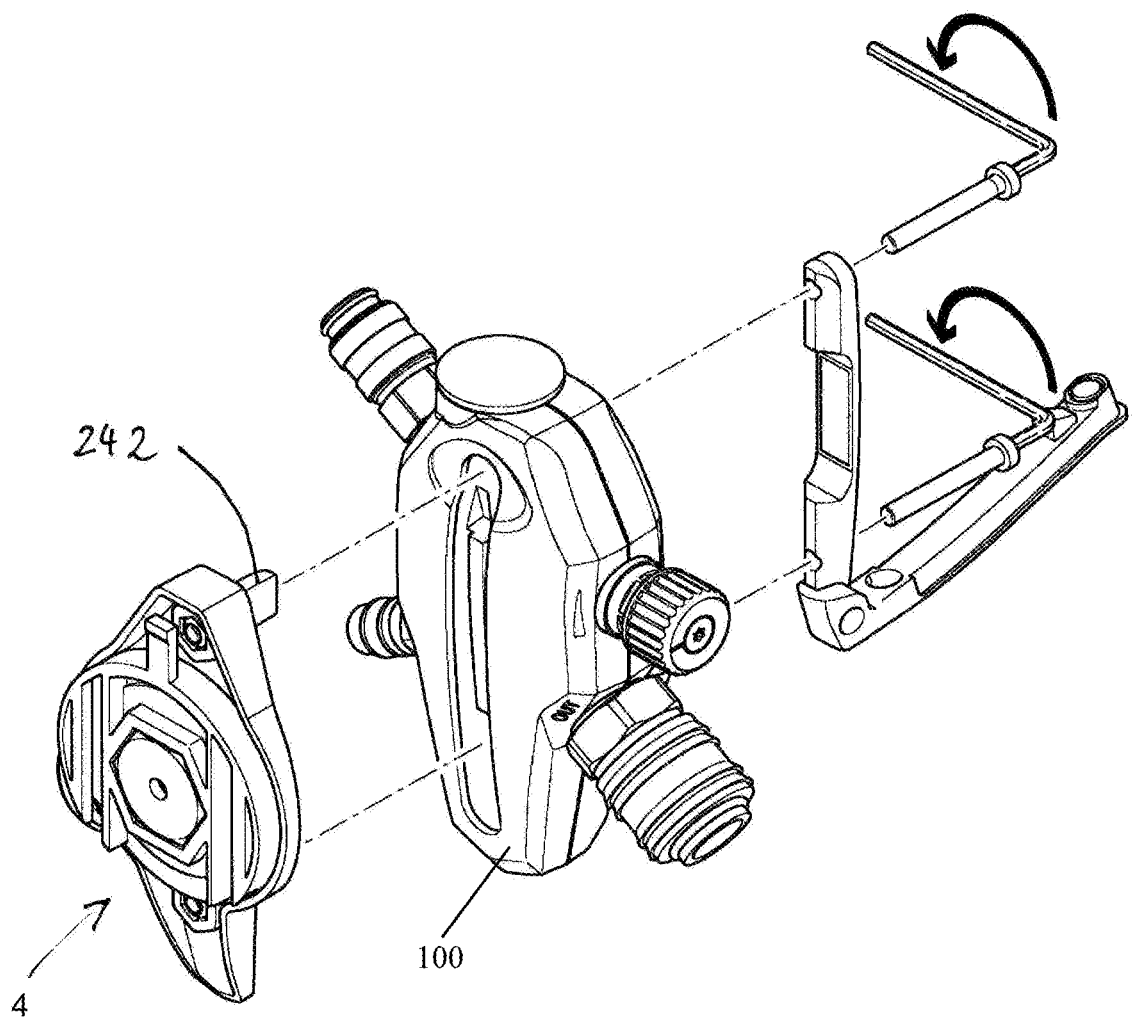
FIG. 3 is a perspective view showing the mounting of the fastening unit with an air regulator unit.
Figure 4A:
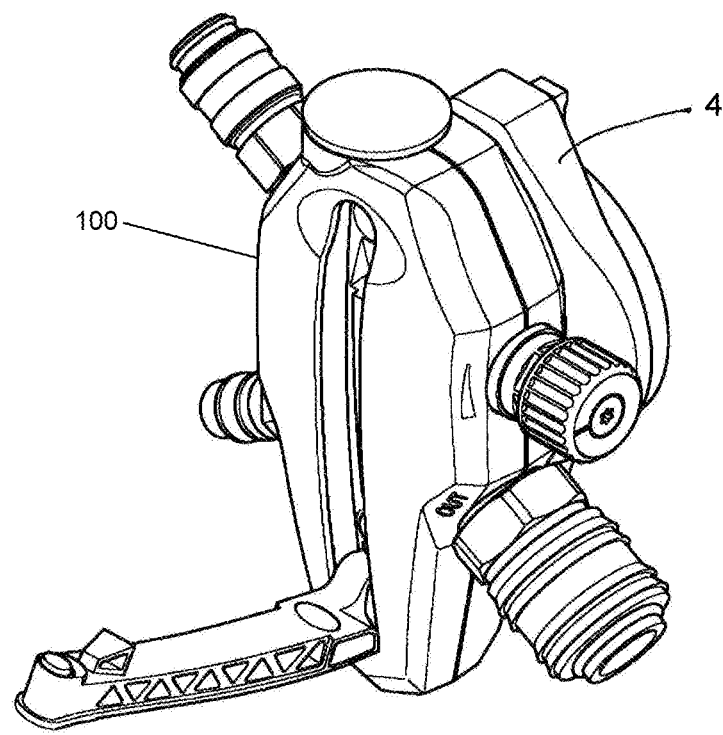
FIGS. 4A and 4B are perspective views showing the fastening unit assembled with the air regulator unit.
Figure 4B:
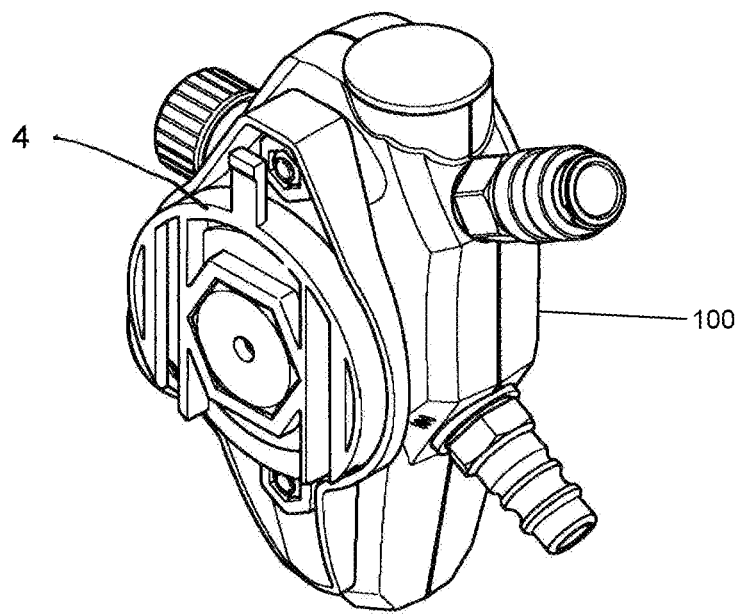
Figure 5A:
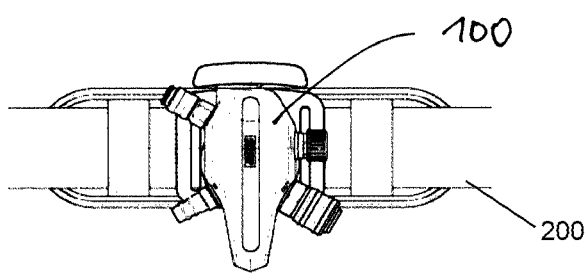
FIGS. 5A to 5E are diagrams showing five different positions of the assembly of FIG. 4A in combination with a hip belt.
Figure 5B:
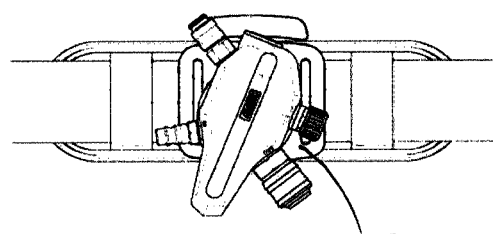
Figure 5C:
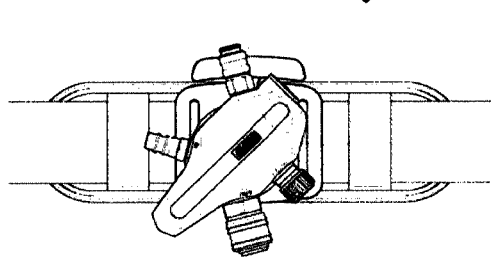
Figure 5D:
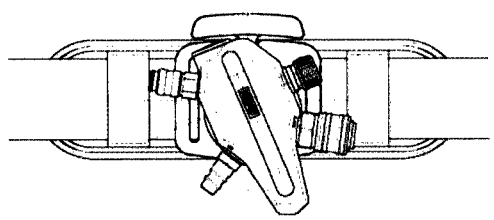
Figure 5E:
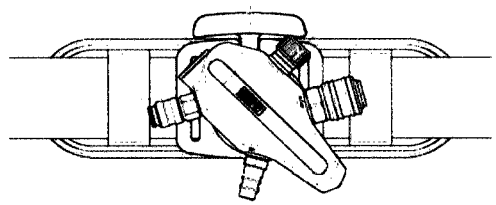

Furthermore, as FIGS. 2A, 2B, and FIG. 3 also show, the fourth section 242 can be inserted into a fastening hole of an air regulator unit 100, which is used as an additional auxiliary module. A screw is inserted into a portion of the fourth hollow section 242 and into a hollow portion of the third section 241 from a side where the second component part 2 with the nut is disposed so that the fastening unit 4 and the air regulator unit 100 are secured to one another as illustrated in 4A and 4B.

In addition, as illustrated in FIG. 2B, the third section 241 has a hexagonal profile so that the nut can be configured in conformity with the third section 241 and can have a hexagonal profile.

As an alternative, although not shown, the second component part can have at least one fastening hole for receiving, a fastening means of the additional auxiliary module, with the at least one fastening hole preferably passing through the second substrate.

In addition, as illustrated in FIG. 2B, the head part of the first screw 3, in conformity with the hexagonal profile of the frame 12, can have a hexagonal cross section so that the hexagonal head part of the first screw 3 can be pushed into the frame 12.

As an alternative, although not shown, the head part of the second screw 3b can have a circular outer profile which conforms to the hexagonal inner profile of the frame 12.

The fastening unit 4 is preferably made of plastic material.

Figure 6:
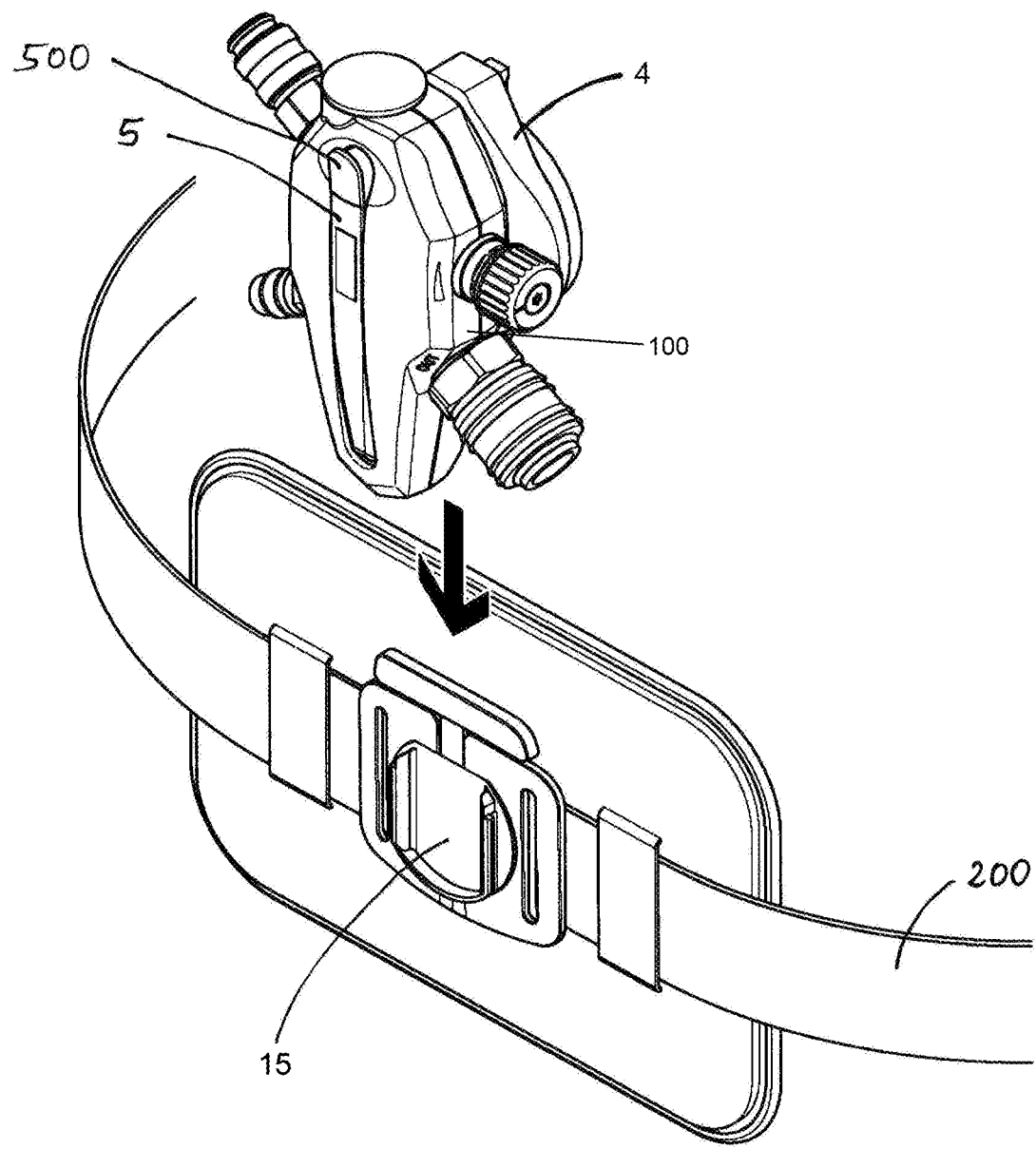
FIG. 6 is a schematic view showing mounting directions for mounting the structure of FIGS. 4A and 5A to 5E on a hip belt.

The fastening unit 4 is exceptionally well-suited to secure the air regulator unit 100, or another unit or module to a waist strap or hip belt 200. As suggested in FIG. 6, the air regulator unit 100, together with the fastening unit 4, can be secured to an adapter 15 of the hip belt 200 by sliding it on from the top. Thus, the projections 13, 16 on the first component part 1 of the fastening unit 4 slide along the adapter 15; and as a projection on the first component part pushes against a tab on the adapter 15, the up and down movement of the air regulator unit 100 is limited.

All of the explanations above refer to the practical example shown in FIGS. 1 to 6.

Next, the present invention will once again be explained in greater detail with reference to FIGS. 7 to 11 based on another description of the fastening unit 4, which is also combined with an air regulator unit 100.

The air regulator unit 100 shown in FIGS. 7-11 comprises a first half shell 100a and a second half shell 100b which form the housing of the air regulator unit 100. The two half shells 100a, 100b are connected to one another along a seam line 300. The connection may be a detachable or an undetachable connection. Possible connections are clip-on connections, adhesive connections or welded connections. A fastening unit 4, which is used to secure the air regulator unit 100 to a hip belt 200, is connected to the first half shell 100a of the housing 100a, 100b. The connection can be a detachable or an undetachable connection. In the practical example at hand, the half shell 100a is detachably connected to the fastening unit 4.

The air regulator unit 100 is fitted with an air inlet connector 7, which allows compressed air to be fed from an external compressed air supply system into the air regulator unit 100. A connector 6 for a hose or the like, which leads to a breathing mask or a breathing hood, is disposed on the same side of the housing 100a, 100b as the air inlet connector 7, however, above the air inlet connector 7. In addition, a connector 9 is disposed on the other side of the air regulator unit 100, which connector leads to a compressed air-operated tool, such as a paint spray gun, to which the compressed air is supplied via a hose. Disposed on the same side as the connector 9, however, above this connector, is a regulator 8, which serves to allow the pressure of the air leading to the breathing mask or breathing hood to be adjusted. For safety reasons, the regulator 8 is configured to ensure that the air regulator unit 100 always supplies air at a predefined pressure to the breathing mask or breathing hood, even when the regulator 8 is set to "minimum."

When the air regulator unit 100 is not in use, the connector 6 for connection with a breathing mask or breathing hood and/or the connector 9 for connection with the spray gun can, if desired, be closed with a blank cover plate or the like.

The air regulator unit 100 can preferably be connected to a pressure display (not shown in the figures).

Figure 7A:
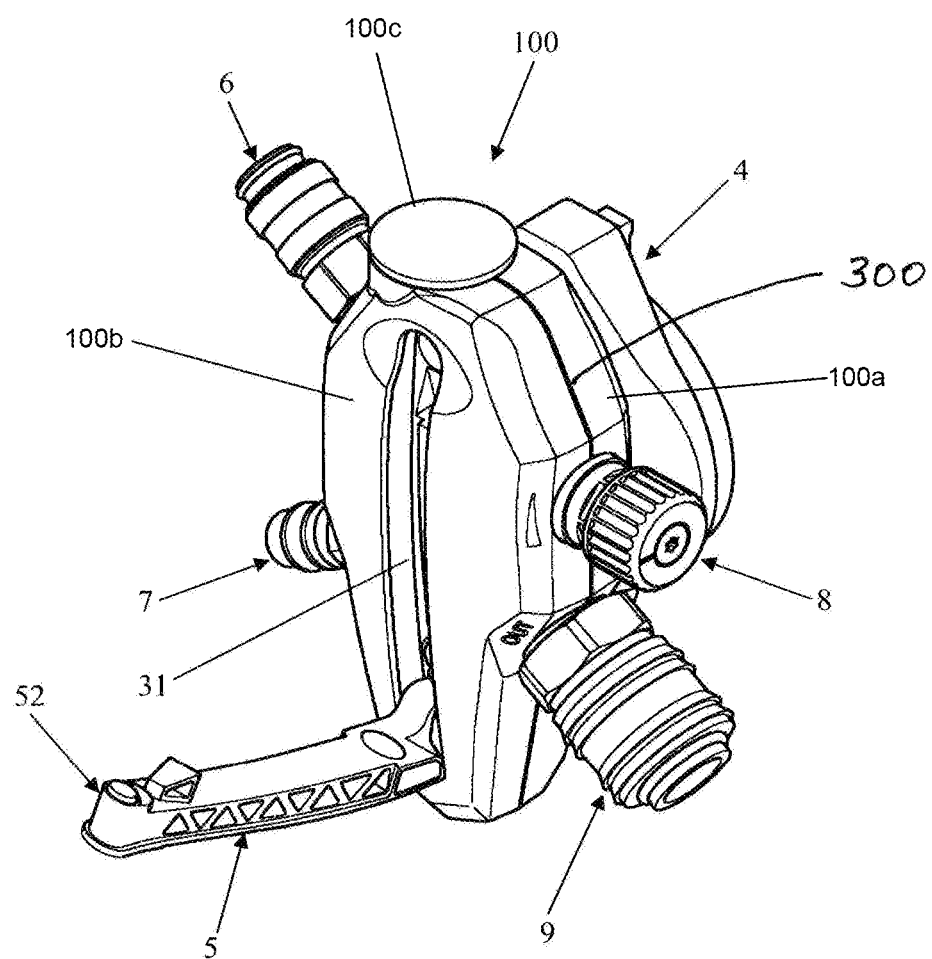
FIG. 7A is a perspective view illustrating a front portion of an air regulator unit connected to the fastening unit according to the present invention.
Figure 7:
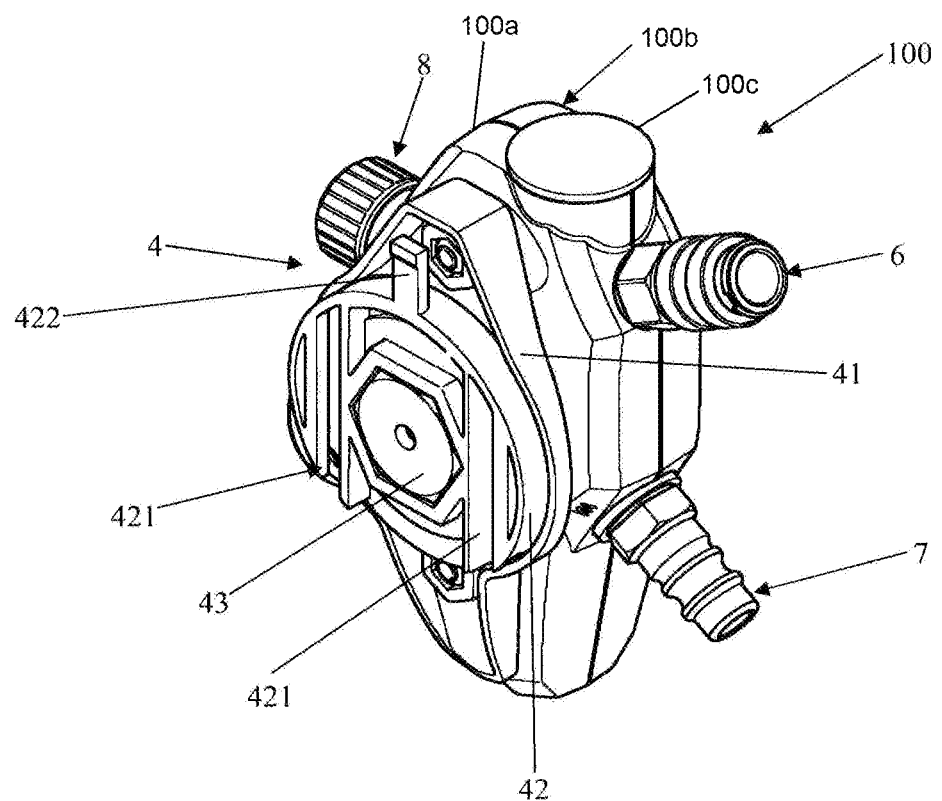
FIG. 7B is a perspective view illustrating a rearward side of the air regulator unit of FIG. 7A.
Figure 8A:
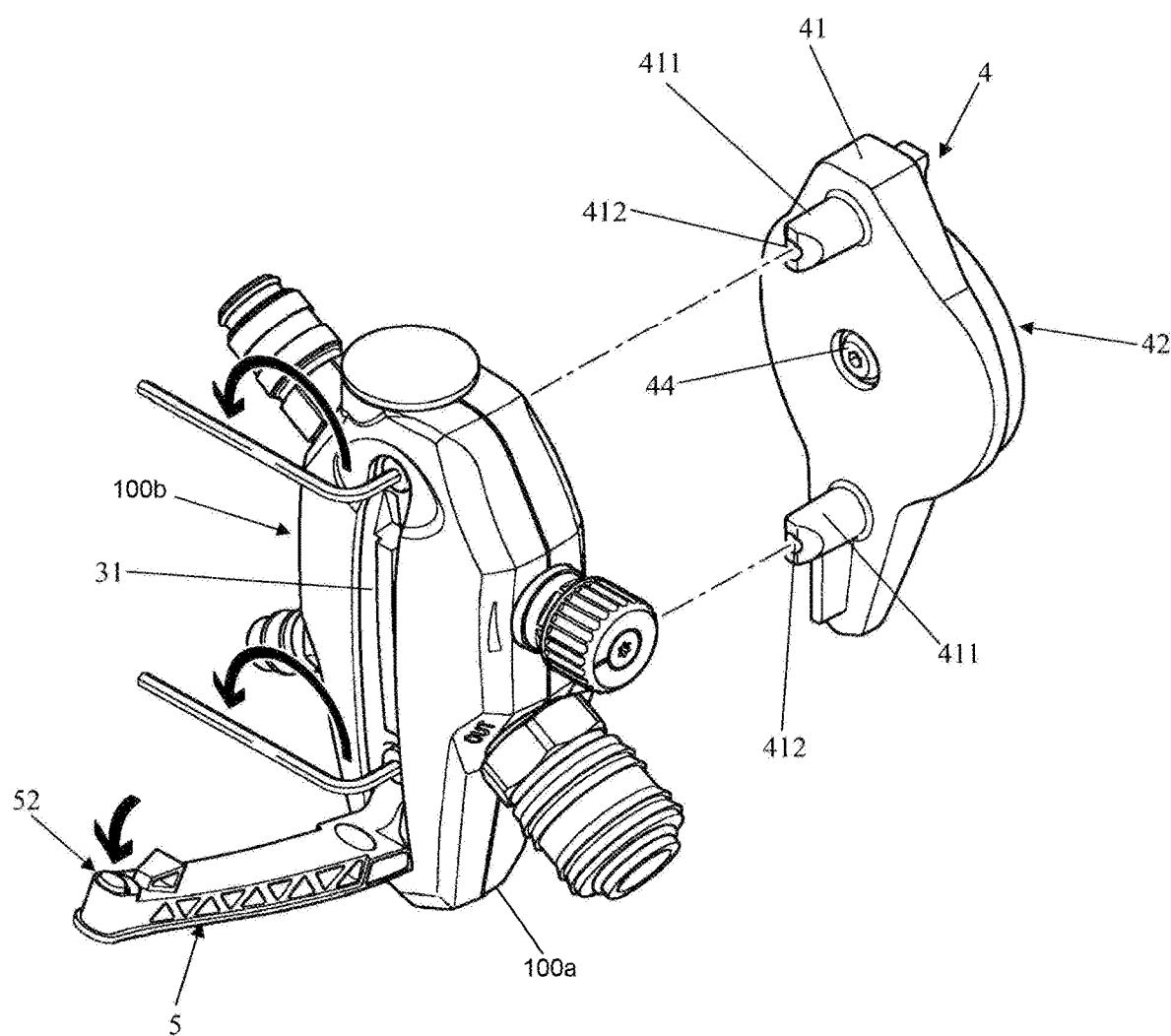
FIG. 8A is a partially exploded perspective view showing the assembly of the air regulator unit.
Figure 8B:
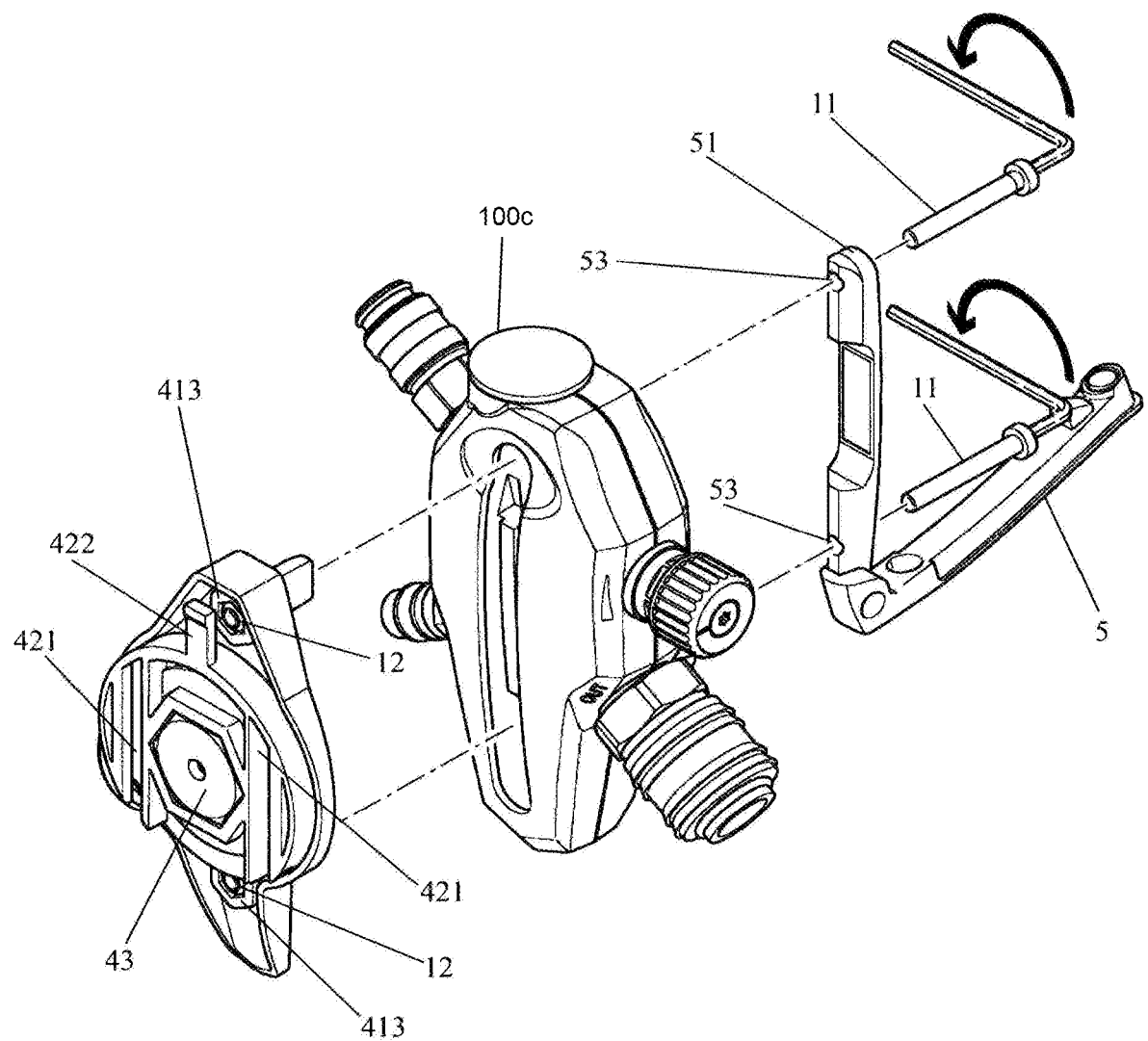
FIG. 8B is an exploded perspective view illustrating a different side of the assembly drawing of FIG. 8A.

In a preferred embodiment, such as shown in greater detail in FIGS. 7A, 8A and 8B, the second half shell 100b of the air regulator unit 100 is fitted with a foldable or rotatable support 5, which can support the spray gun or the breathing air supply hose when the spray gun, or the breathing mask or breathing hood is not in use. As illustrated in FIG. 8B, a first arm of the two-arm support 5 is secured to the air regulator unit 100 by means of a screw 11. The other arm, i.e., the second arm, of the support 5 is hinged to the first arm, but it is free on the other end. It can be rotated relative to the air regulator unit 100.

As illustrated in FIG. 8A, the second arm of the support 5 can be rotated through an angle between 20° to 90°, preferably an angle of 70°. In addition, a first locking element 52, preferably a magnet, is disposed on the free end of the second arm of the support 5. The locking element 52 interacts with a second locking element (preferably with a magnet) which is disposed on the air regulator unit 100. In the practical example at hand, the second locking element is secured to the support 5 in the area of a disk seat 51 which is disposed on the non-free upper end of the first arm of the support 5. In summary, the support 5 in the folded position can be securely supported on the air regulator unit 100 when not in use. And, as shown in FIGS. 7A and 7A, a stepped-down groove 31 is configured in the second half shell 100b of the housing. The dimensions of the groove 31 are adapted to the support 5 in such a manner that, except for a tab 500 on the upper end, the second arm in the folded position sits flush in the groove 31.

FIGS. 8A and 8B, respectively, show a front view and a rear view of the fastening unit 4 of the air regulator unit 100. The fastening unit 4 comprises connecting elements 41, 42 suitable to connect the first half shell 100a of the housing of the air regulator unit 100 to an adapter 15 which is part of a hip belt 200 (see FIG. 10).

As illustrated in FIGS. 8A and 8B, the first connecting element 41 of the fastening unit 4, which in the practical example at hand has a substantially oval profile, comprises two hollow projections 411, which are disposed on the top and on the bottom of the connecting element 41 and which project in the direction of the first half shell 100a of the housing of the air regulator unit. A fastening bore 412 is configured into each projection 411. The first half shell 100a comprises complementary fastening holes, into which the projections 411 can be inserted. As FIG. 8B illustrates, screws 11 are used, which pass through fastening holes 53 configured into the disk seats 51 disposed on the on top and on the bottom of the first arm of the support 5 and subsequently through fastening holes in the first half shell 100a and into the second half shell 100b of the housing of air regulator unit 100, The fastening unit 4 is secured to the projections 411 by means of bolts 12. To ensure an especially secure attachment, bolt seats 413 for screws or the like are provided.

Figure 9A:
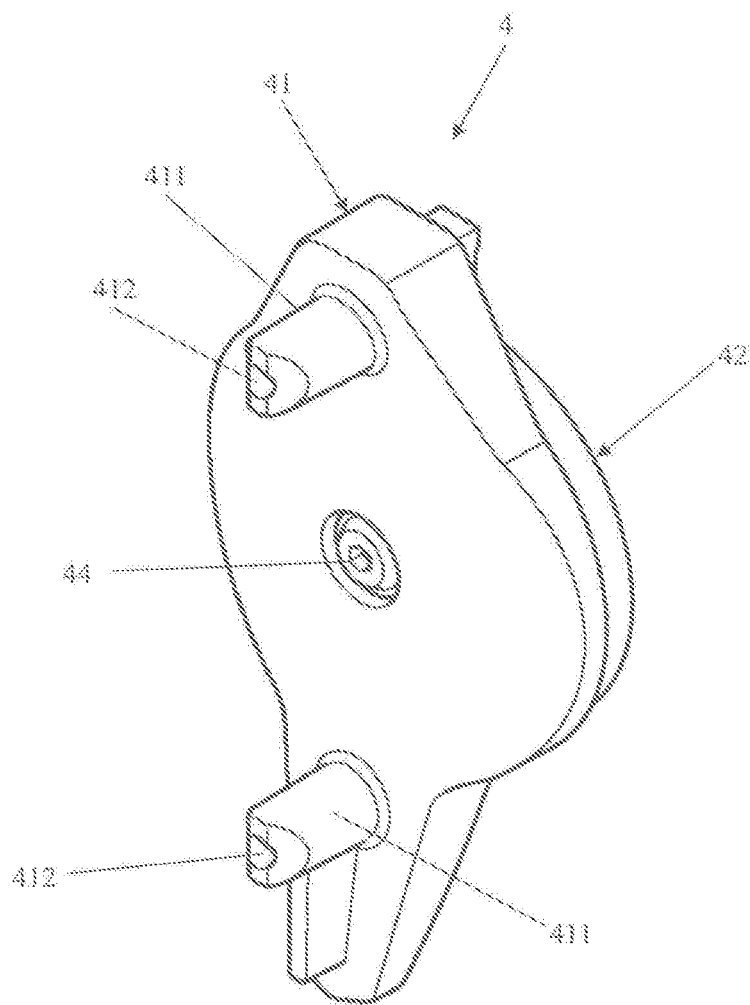
FIG. 9A is a perspective view illustrating the fastening unit of the air regulator unit.
Figure 9B:
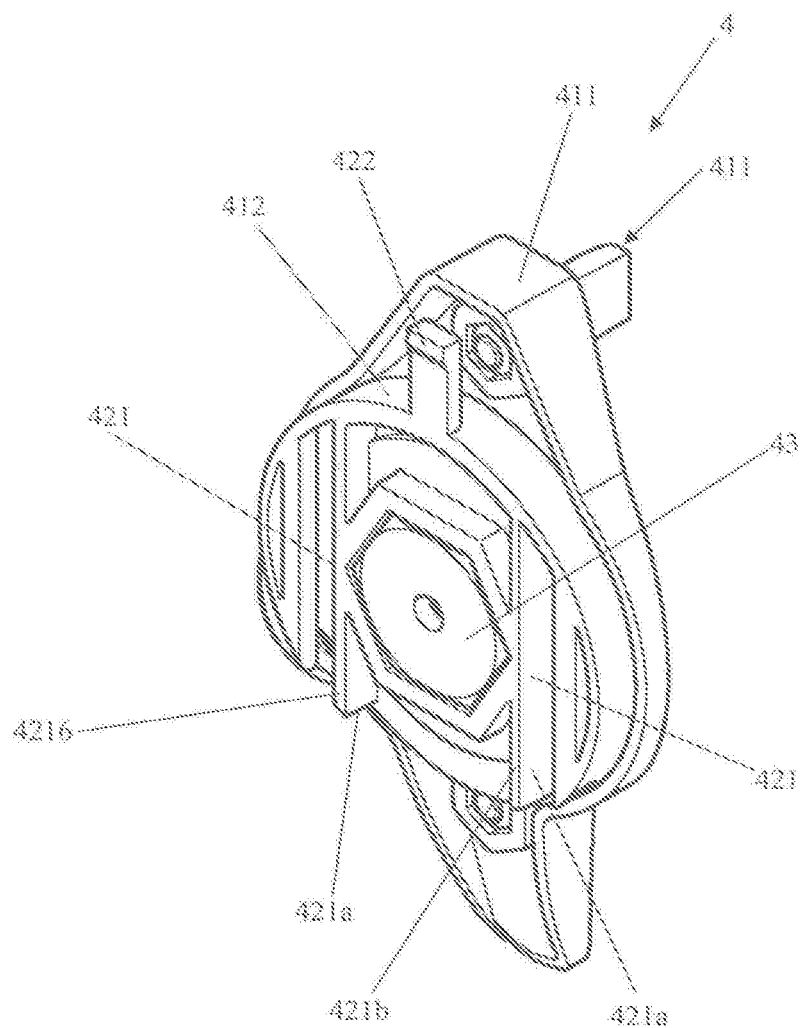
FIG. 9B is a perspective view showing a different side of the fastening unit.

As shown in FIG. 9B, two sliding slots 421 are provided in the adapter area 42 of the fastening element 4. The adapter area 42 has a circular profile. A stop contact 422 projects outwardly from the circumferential surface of the adapter area 42 on the upper side of the adapter area 42. Two parallel projections 421b which project from the circular area near the center of the adapter area 42 form the upper surface of an inner wall 421a for one of the two sliding slots 421. Using this arrangement according to the invention, it is possible to connect the air regulator unit 100 to the hip belt 200.

Figure 10:
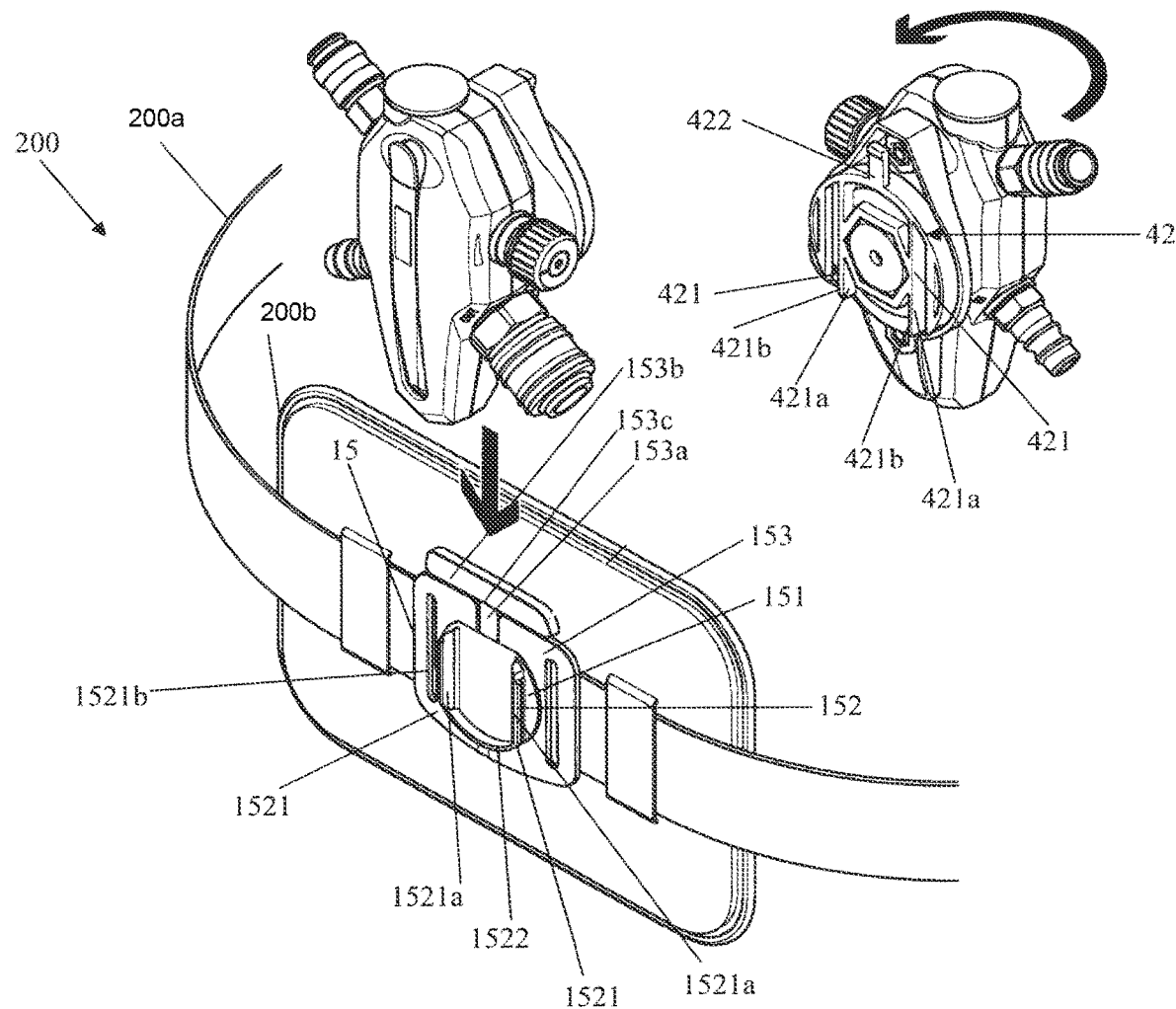
FIG. 10 is a schematic perspective view showing the fastening of the fastening unit with the air regulator unit to a hip belt.

The hip belt 200, shown FIGS. 10 and 11, comprises a waist strap 200a having an inwardly facing surface, which is padded with a cushion 200b. On the outwardly-facing surface of the waist strap 200a, an adapter 15 is disposed for the fastening unit 4 of the air regulator unit 100.

The adapter 15 comprises a carrier plate 151, a fastening plate 152 supported by the carrier plate 151 and a release mechanism 153. The adapter 15 comprises two guide rails 1521, the positions and shapes of which are coordinated so as to conform to the two sliding slots 421 in the adapter area 42 of the fastening unit 4. A stop element 1522 connects the lower ends of the two guide rails 1521; thus, the stop 1522 element and the two guide rails 1521 form a substantially "U" shape. Each guide rail 1521 comprises a fin 1521a, which projects from the fastening plate 152. The two fins 1521a are disposed on the fastening plate 152 along the longitudinal direction of the waist strap 200a and extend parallel to one another along the width direction of the waist strap 200a. The upper portion of each fin 1521a has a projection 1521b which projects outwardly in the longitudinal direction of the waist strap. On the fastening plate 152, each projection 1521b defines a guide or bracket for the sliding slots 421 in the adapter area 42 of the fastening unit 4.

The release mechanism 153 comprises a one-arm lever 153a and a handle 153b, which is connected to the lever 153a. As FIG. 10 illustrates, the lever 153a is disposed in a recess on the upper portion of the fastening plate 152. The lever 153a is made of a relatively flexible material, which ensures that it can be deformed when pressure is exerted on the handle 153b. In the practical example at hand, the lever 153a is integrally formed in one piece with the fastening plate 152 and is cut out of the plate 152. The handle 153b is integrally formed in one piece with the upper end of the lever 153a. In the practical example at hand, the surface of the handle 153b is larger than the surface of the lever, which causes a stop surface 153c to be formed between the handle 153b and the lever 153a.

FIG. 10 shows in greater detail how the air regulator unit 100 can be fastened to, and subsequently released from, the hip belt 200 in the adapter area 42 of the fastening unit 4 by means of the adapter 15 on the hip belt. After appropriate alignment, the guide rails 1521 on the fastening plate 152 of the adapter 15 can be inserted into the sliding slots 421 in the adapter area 42 of the fastening unit 4 by a downwardly directed pressure which by moving the air regulator unit 100 downwardly in the direction of the arrow 1 (FIG. 10). Since this causes the projections 421b of the sliding slots 421 and the projections 1521b of the guide rails 1521 to interlock, the air regulator unit 100 is securely fastened to the hip belt 200. The stop element 1522 on the adapter 15 limits the sliding movement sin the downward direction, thereby preventing an undesirable drop of the air regulator unit 100. The upper end of the stop contact 422 on the fastening unit 4 prevents the stop surface 153c of the release mechanism 153 of the adapter 15 from making undesirable contact with the air regulator unit 100.

As illustrated in in FIG. 11, the air regulator unit 100 can be easily removed from the hip belt 200. By pushing the handle 153b in the direction of the arrow 1 (FIG. 11), i.e., toward the wearer of the hip belt 200, which causes the stop contact 422 on the fastening unit 4 to make contact with the stop surface 153c of the lever 153a, the release mechanism 153 is actuated, and the air regulator unit 100 can be removed by moving it upwardly in the direction of the arrow 2 (FIG. 11).

Although the embodiment describes and shows only an example of sliding slots 421 in the adapter area 42 of the fastening unit 4 and guide rails 152 on the adapter 15 of the hip belt 200, it is also possible for sliding slots to be disposed on the adapter 15 and for guide rails to be disposed on the fastening unit 4. Other types of sliding or push-in connections or any other detachable connection, such as clip-on or snap-in connections, can be used as well.

As illustrated in FIGS. 9A and 9B, the adapter area 42 and the connecting element 41 of the fastening unit 4 are connected to one another by means of a thin hexagonal nut 43 and a screw 44. Since the adapter area 42 is connected to the connecting element 41, the air regulator unit 100 (or another module secured to the fastening unit 4) can be rotated relative to the hip belt 200 (see FIGS. 5A to 5E of the previous practical example). This contributes to further increasing the comfort of the operator.

In addition, as shown in FIGS. 7A and 7B, the air regulator unit 100 is fitted with a color code system disk 100c (CCS disk). In the practical example at hand, a circular recess is configured into the upper surface of the housing 100a, 100b of the air regulator unit 100, into which recess the circular color code system disk 100c can be clipped.

Individual air regulator units 100 can be personalized with color code system disks 100c of different colors. This also allows individual air regulator units to be easily dedicated to individual breathing masks or breathing hoods. Other types of fastening means and forms of color code systems are, of course, also possible.

It goes without saying that identification means other than color code system disks can be used as well. Using some identification means will definitely further improve the safety of respiratory protection systems.

All elements or subelements of the air regulator unit 100 are preferably made of a plastic material. In another possible embodiment, the two half shells 100a, 100b of the housing can have different colors. By matching the colors or the half shells to the colors of the hip belt and/or of the adapter 15, assembly errors can be nearly completely ruled out.

According to another embodiment of the invention, the adapters described by the present invention are disposed in a plurality of places on the hip belt. This allows a plurality of air cleaning units of the same type, or of different types, such as air heater modules, air humidifier modules, or activated charcoal adsorbent modules, which are fitted with a fastening unit according to the present invention and/or which have the same or a similar configuration in the housing area as the above-described air regulator unit, to be readily secured to the hip belt.

It is recommended that two places be chosen which, when the user is wearing the waist belt, are subsequently located on the left side and on the right side of the waist of the user. This makes it possible for users to switch the air cleaning units from one side to the other side, thereby allowing the belt unit to be readily used both by left-handers and by right-handers.

Finally, it should once again be emphasized that all that is said above describes solely preferred embodiments of the present invention, without however limiting the present invention to these embodiments. To those skilled in the art, other variations and modifications may be conceivable. All modifications, equivalent substitutions and improvements, which fall within the spirit of the invention and which are based on the principle of the invention, shall be covered by the protective scope of the invention.

What is claimed is:

1. A fastening unit for securing a first module relative to a second module, the fastening unit comprising a first component part for assembly with the second module and a second component part for assembly with the first module,
   wherein the second component part with the first component part is rotatable about a predefined angle relative to the first component part; first and second subcomponents within a range of the predefined angle are engageable with each other in a plurality of positions; wherein the first module or the second module is an air regulator unit and the air regulator unit comprises a housing and a support, the support configured for supporting and holding a spray gun or a breathing air supply air hose when the air regulator unit is not in use in an unfolded position and is not capable of supporting and holding a spray gun or a breathing air supply hose in a folded position.

2. The fastening unit as in claim 1, wherein the air regulator unit comprises:
- an air inlet connector configured for receiving compressed air from an air supply unit;
- a connector configured for connecting to a breathing mask or breathing hood; and
- an adapter secured on or to the housing of the air regulator unit, the adapter configured for providing a detachable connection with another component.

3. The fastening unit as in claim 2, wherein the adapter has one or a plurality of sliding slots configured for enabling a sliding connection with respective guide rails of another component on a waist strap or hip belt.

4. The fastening unit as in claim 3, wherein the air regulator unit further comprises an identification element.

5. The fastening unit as in claim 3, wherein the housing of the air regulator unit is made of plastic material.

6. The fastening unit as in claim 5, wherein the housing of the air regulator unit is composed of two half parts.

7. The fastening unit as in claim 2, wherein the adapter has one or a plurality of sliding slots configured for enabling a sliding connection with respective sliding components of another component on a waist strap or hip belt.

8. The fastening unit as in claim 2, further comprising at least one projection, said projection configured for enclosing and being enclosed.

9. The fastening unit as in claim 2, wherein the housing of the air regulator unit is configured for rotation.

10. The fastening unit as in claim 9, wherein the housing is configured for engaging the adapter in a plurality of rotational angle positions.

11. The fastening unit as in claim 2, wherein the adapter has a stop contact configured for blocking a stop contact of another component after the adapter has established a sliding connection with the other component.

12. The fastening unit as in claim 2, wherein the air regulator unit is configured for connection to a pressure display.

13. The fastening unit as in claim 2, wherein the air regulator unit further comprises an outlet connector configured for connecting to a compressed air-operated tool.

14. The fastening unit as in claim 1, wherein the support, in one or more positions thereof, is secured and configured for pivoting relative to the housing of the air regulator unit.

15. The fastening unit as in claim 14, wherein an angle of pivoting is between 20 degrees and 90 degrees.

16. The fastening unit as in claim 14, further comprising a locking element disposed on a free end of the support and a corresponding locking element disposed on the housing of the air regulator unit so that the free end of the support is locked on the housing of the air regulator unit when the support is folded.

17. The fastening unit as in claim 16, wherein the locking element and the corresponding locking element are magnets.

18. The fastening unit as in claim 1, in combination with at least one adapter on a belt unit, wherein the at least one adapter is configured for establishing a detachable sliding connection with at least one of the air regulator unit and the fastening unit.

19. A fastening unit for securing a first module relative to a second module, the fastening unit comprising a first component part for assembly with the second module and a second component part for assembly with the first module, wherein the second component part with the first component part is rotatable about a predefined angle relative to the first component part; first and second sub-components within a range of the predefined angle are engageable with each other in a plurality of positions; wherein the first module or the second module is an air regulator unit having a housing and a foldable support configured for supporting and holding a spray gun or breathing air supply air hose in a folded position when the air regulator unit is not in use;

wherein the foldable support includes:

a first arm secured to the air regulator unit;

a second arm hinged to the first arm and having a free end; and a locking element disposed on the free end of the second arm configured for engaging a corresponding locking element disposed on the housing of the air regulator unit when the foldable support is in the folded position.

* * * * *